April 11, 1967 C. A. FLOOD 3,313,667
PRINTING TAPERED ARTICLES BY HEAT TRANSFER
Filed Dec. 11, 1964

INVENTOR.
Carl A. Flood
BY
Roberts, Cushman & Grover
ATT'YS

United States Patent Office 3,313,667
Patented Apr. 11, 1967

3,313,667
PRINTING TAPERED ARTICLES BY HEAT TRANSFER
Carl A. Flood, Framingham, Mass., assignor to Dennison Manufacturing Company, Framingham, Mass., a corporation of Nevada
Filed Dec. 11, 1964, Ser. No. 417,571
3 Claims. (Cl. 156—230)

This invention relates to the application of indicia to tapered articles such as plastic bottles and more particularly to the transfer of thermoplastic ink from a strip of paper or the like to the tapered articles. As described in my prior Patents 3,064,714 and 3,079,979 it has been proposed to feed such a strip past an applicator station and to press the strip against an article with a heated applicator while rotating the article so that its surface is traveling at the same velocity as the applicator. While this can be accomplished satisfactorily with a cylindrical article, with a tapered article such as a tapered bottle difficulties arise because the velocity of the larger end of the rotating article is greater and the velocity of the smaller end is less than the average velocity at the middle of the article. Thus while the transfer is satisfactory at the middle it tends to blur at the ends because the smaller end of the article is moving slower than the strip and the larger end is moving faster than the strip. To overcome this difficulty it has been thought necessary to synchronize the speed of the strip with that of the article throughout the width of the strip, and apparatus for doing this is disclosed in my Patent 3,139,368. However such apparatus is complicated and difficult to adjust.

The object of the present invention is to effect satisfactory transfer to tapered articles without the aforesaid complicated apparatus.

In one aspect the invention involves a method of transferring ink from a printed strip to an article having a conical surface which comprises feeding the strip at a predetermined linear velocity along one side of the article in a direction transverse to the axis of the article, rotating the article about its axis so that the aforesaid side of the article travels in said direction at a velocity substantially equal to said velocity at the zone of its periphery opposite the longitudinal median line of the labels on the strip, with corresponding lesser and greater velocities at the small and large ends of the conical surface, and hot-pressing the strip against the article along a line of tangency during a portion of a revolution of the article. More specifically the method involves the use of a strip having a base coating on which the ink is printed, the melting point of the coating being lower than that of the ink so that the hot-pressing softens the coating more than the ink, whereby the ink adheres firmly to the article and the slippage between strip and article at the ends of the article occurs in the coating and not in the ink. The melting point of the ink may be of the order of 230°–330° F. and that of the coating 170°–220° F. In making a transfer the ink is not melted but merely softened to make it tacky. The ink transfers to the article with a portion of the wax transferring with the ink.

The label strip is preferably formed by applying a wax coating to a sheet of paper and printing the labels on the wax coating. While many waxes may be used, oxidized microcrystalline waxes are satisfactory. The wax may be applied from emulsion, solution or from a 100% solids hot melt. The labels may be printed on the dry coating by any conventional process such as letterpress printing, rotogravure, etc. Any thermoplastic ink having a melting point higher than that of the wax may be used. For example polyvinyl acetate, plasticized nitrocellulose or styrene-butadiene copolymer may be used as binders for the usual rotogravure ink pigments.

In another aspect the invention involves apparatus comprising means for feeding the aforesaid strip at a predetermined linear velocity along one side of the article in a direction transverse to the axis of the article, means for rotating the article about its axis so that said side of the article travels in said direction at a velocity substantially equal to said velocity at the zone of its periphery opposite the longitudinal median line of the strip, with corresponding lesser and greater velocities at the small and large ends of the conical surface, and means for hot-pressing the strip against the article along a line of tangency during a portion of a revolution of the article.

For the purpose of illustrating a typical embodiment of the invention is shown in the accompanying drawings in which—

Figure 1:
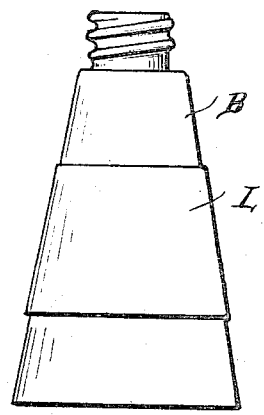
FIG. 1 is a side view of a tapered bottle with a label applied thereto according to the present invention.
Figure 2:
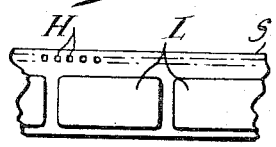
FIG. 2 is a plan view of a label strip for use in applying labels.

The particular embodiment chosen for the purpose of illustration involves an applicator in the form a rotary heat-transfer iron I such as shown in FIG. 1 for applying labels L from the label strip S having sprocket holes H such as shown in FIG. 2. As described and claimed in my Patents 2,981,432, 3,064,714 and 3,079,979, this label-applying mechanism comprises a main frame 1 carrying the mechanism for feeding the label strip S from the feed roll 2 to a take-up reel 3 past the heat-transfer iron and mechanism for feeding bottles B past the label-applying station on the side of the label strip opposite the iron. The label strip feeds over a sprocket roll 12 which meshes with the perforations in the margin of the label strip and rotates at a constant continuous speed, thence over two rolls 8 and 9 at opposite ends of the reciprocating carriage 11 and thence over an idler roll 7. The bottles B are fed to and from the label-applying station through chutes 13 and 14. At the label-applying station is a turret 16 having peripheral recesses to receive the individual bottles. In the feed chute 13 the bottles are pressed against the turret so that a bottle enters each empty recess as the recess passes the chute and as each bottle reaches the delivery chute 14 it is discharged through that chute. The bottles are fed to and from the turret 16 by conveyor belts 18 and 19. The iron I has a raised portion 17 whose circumferential length is preferably equal to the length of each label and the labels are fed to the label-applying station in synchronism with the rotating iron so that the leading edge of the raised portion 17 engages the leading edge of a label and as the two progress in unison the label is pressed against the bottle at the label-applying station, the bottle being rotated in synchronism with the iron.

When the carriage 11 is stationary the label strip S is advanced by the drive roll 12 at a constant continuous speed. However, the advance of the label strip past the label-applying station should be arrested after each bottle has been labeled while the next bottle is being brought into position to be labeled. This is accomplished by moving the carriage back and forth lengthwise of that portion of the path of the label strip extending from roller 8 to roller 9.

As shown in FIG. 1 the carriage 11 carries the rollers 8 and 9 by means of two brackets 20 and 21. Mounted on the rear side of the carriage is a cam follower 23 sliding in a slot 24 on the front side of an adjustable cam 26 which is rotatably mounted in a slide 27 which slides horizontally in a U-shaped guide 25 fast to the frame 1. The bottle turret 16 is actuated by similar cam block 26' similarly mounted on the lower end of the slide 27 and carrying a similar cam follower 23' which actuates carriage 11'.

Figure 5:
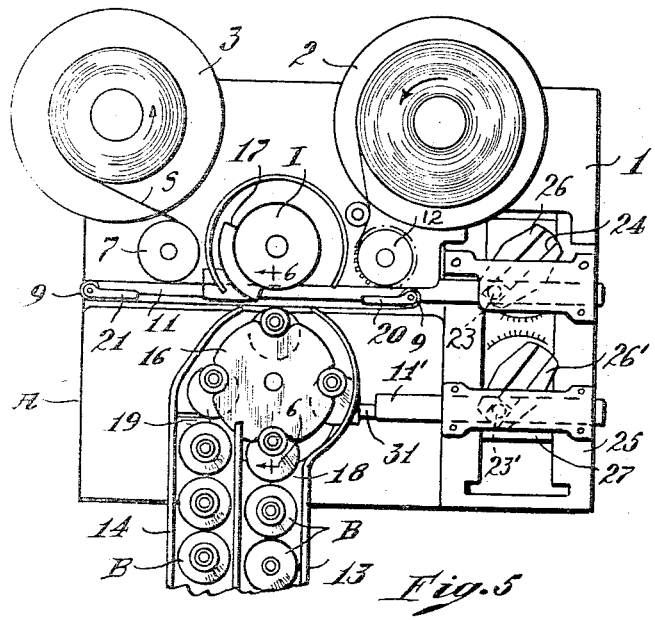
FIG. 5 is a plan view of a machine for applying labels according to this invention.
Figure 6:
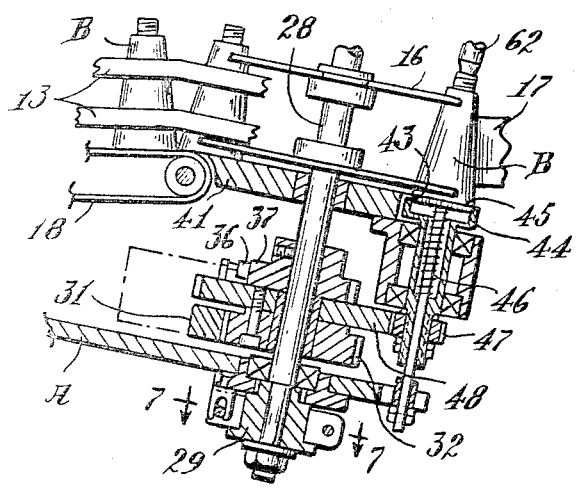
FIG. 6 is a section on line 6—6 of FIG. 5.
Figure 7:
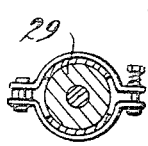
FIG. 7 is a section on line 7—7 of FIG. 6.

The turret 16 is mounted on a shaft 28 journaled in the main frame 1 (FIG. 6). Engaging the lower end of the shaft is a friction brake 29 to prevent overthrow of the turret as it is advanced step by step (FIGS. 6 and 7). The shaft 28 is rotated step by step by a rack 31 and pinion 32 (FIGS. 5 and 6), the rack 31 being reciprocated by the carrier 11' (FIG. 5). Mounted on the pinion 32 is a gear 48 carrying a dog 36 engaging a ratchet 37 fast to the shaft 28. When the rack reciprocates to the right it advances the turret one step and as it reciprocates to the left the dog 36 slides over the ratchet 37.

Under the turret 16 is a table 41 having an opening 43 at the applicator station (FIG. 6). As the bottles are pushed over the table 41 by the turret they are moved successively into the opening in the table when the turret pauses between steps. In the opening is a cup-like rotor 44 having a disk 45 which is pressed upwardly against the bottom of the bottle by means of a spring 46. The rotor 44 is rotated by means of a pinion 47 meshing with the gear 48 fast to the pinion 32 (FIG. 6). Thus as the carriage 11' reciprocates to the left during each pause of the turret the bottle at the applicator station is rotated in the counterclockwise direction as viewed from above. Preferably the bottle is pressed against the rotor 44 by a nozzle 62 which may also be used to inflate the bottle while being labeled.

Inasmuch as the aforesaid mechanism is described and claimed in the aforesaid patents, further description is unnecessary for a full understanding of the present invention.

Figure 3:
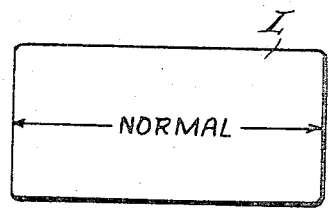
FIG. 3 is an enlarged view of a label before being applied.
Figure 4:
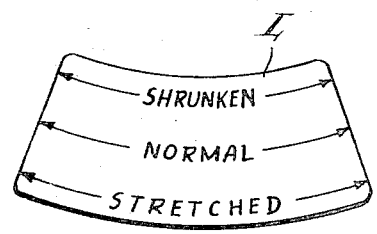
FIG. 4 is a development of a label after being applied showing how its upper portion has been shrunk and its lower portion stretched.

According to this invention the turret is tipped so that the line of contact between the tapered bottle B and strip S is vertical (FIGS. 5 and 6) and the bottle is rotated at a rate which makes its linear velocity equal to that of the strip at the circumferential line of the article opposite the median line of the labels on the strip. While the peripheral velocity of the article is less than that of the strip above said median line and greater below the median line, blurring is avoided by making the melting point of the ink higher than that of the wax coating and heating the coating to the point where the slippage occurs in the coating and not in the ink. The thermoplastic ink is heated to the point where it adheres firmly to the article on contact with the article, the softened coating permitting the ink to slide relatively to the paper strip. When the inked indicia comprising the label contacts the surface of the article at the beginning of the nip between iron I and strip S it remains unchanged along the middle but is pushed back along the top and is pulled forward along the bottom of the label. This action progressively changes the shape of the label from rectangular as in FIG. 3 to the developed shape as in FIG. 4. As this change occurs the ink portions adhere progressively to the surface of the article and then travel through the nip without further change because the difference in velocities of the article and the label strip results only in a skidding action between the ink and the coating and not between the ink and the surface of the article.

It should be understood that the present disclosure is for the purpose of illustration only and that this invention includes all modifications and equivalents which fall within the scope of the appended claims.

I claim:

1. In transferring ink from a printed strip to an article having a conical surface, the method which comprises feeding the strip at a predetermined linear velocity along one side of the article in a direction transverse to the axis of the article, rotating the article about its axis so that said side of the article travels in said direction at a velocity substantially equal to said velocity at the zone of its periphery opposite the longitudinal median line of the strip, with corresponding lesser and greater velocities at the small and large ends of the conical surface, and hot-pressing the strip against the article along a line of tangency during a portion of a revolution of the article.

2. In transferring ink to an article having a conical surface from a strip of material having a base coating printed with ink, the method which comprises feeding the strip at a predetermined linear velocity along one side of the article in a direction transverse to the axis of the article, rotating the article about its axis so that said side of the article travels in said direction at a velocity substantially equal to said velocity at the zone of its periphery opposite the longitudinal median line of the strip, with corresponding lesser and greater velocities at the small and large ends of the conical surface, and hot-pressing the strip against the article along a line of tangency during a portion of a revolution of the article, the melting point of said coating being lower than that of the ink so that said hot-pressing softens the coating more than the ink, whereby the ink adheres firmly to the article and the slippage between strip and article at the ends of the article occurs in the coating and not in the ink.

3. For transferring ink from a printed strip to an article having a conical surface, apparatus comprising means for feeding the strip at a predetermined linear velocity along one side of the article in a direction transverse to the axis of the article, means for rotating the article about its axis so that said side of the article travels in said direction at a velocity substantially equal to said velocity at the zone of its periphery opposite the longitudinal median line of the strip, with corresponding lesser and greater velocities at the small and large ends of the conical surface, and means for hot-pressing the strip against the article along a line of tangency during a portion of a revolution of the article.

References Cited by the Examiner

UNITED STATES PATENTS 3,139,368   6/1964   Flood _____ 156—475

EARL M. BERGERT, *Primary Examiner.*

M. L. KATZ, *Assistant Examiner.*